United States Patent
Narkis et al.

(10) Patent No.: US 10,027,601 B2
(45) Date of Patent: Jul. 17, 2018

(54) FLOW-BASED PACKET MODIFICATION

(71) Applicant: Mellanox Technologies Ltd., Yokneam (IL)

(72) Inventors: Lior Narkis, Petach Tikva (IL); Noam Bloch, Bat Shlomo (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 125 days.

(21) Appl. No.: 14/729,127

(22) Filed: Jun. 3, 2015

(65) Prior Publication Data

US 2016/0359768 A1 Dec. 8, 2016

(51) Int. Cl.
*H04L 12/935* (2013.01)
*H04L 29/06* (2006.01)
*H04L 12/70* (2013.01)

(52) U.S. Cl.
CPC .......... *H04L 49/3009* (2013.01); *H04L 69/22* (2013.01); *H04L 2012/5652* (2013.01)

(58) Field of Classification Search
None
See application file for complete search history.

(56) References Cited

U.S. PATENT DOCUMENTS

| | | | |
|---|---|---|---|
| 2005/0220102 A1* | 10/2005 | Tschudin | H04L 45/566 370/389 |
| 2011/0173608 A1* | 7/2011 | Buragohain | G06F 9/45558 718/1 |
| 2011/0200046 A1* | 8/2011 | Kojima | H04L 49/351 370/392 |
| 2013/0114599 A1 | 5/2013 | Arad et al. | |
| 2016/0150055 A1* | 5/2016 | Choi | H04L 69/161 370/401 |

OTHER PUBLICATIONS

Infiniband Trade Association, "InfiniBandTM Architecture Specification vol. 1", Release 1.2.1, Nov. 2007.

* cited by examiner

*Primary Examiner* — Kouroush Mohebbi
(74) *Attorney, Agent, or Firm* — D. Kligler IP Services Ltd.

(57) ABSTRACT

Communication apparatus includes a host interface, which is configured to be connected to a peripheral component bus, and a network interface, which is configured to be connected to a network. Packet processing circuitry is coupled between the host interface and the network interface and is configured to receive from a first interface, selected from among the host interface and the network interface, a data packet comprising a header containing multiple fields having respective values, to identify, responsively to a value of at least one of the fields, a corresponding entry in a header modification table, and to modify the header in accordance with the identified entry. The data packet with the modified header is transmitted through a second interface selected from among the host interface and the network interface.

24 Claims, 3 Drawing Sheets

FLOW-BASED PACKET MODIFICATION

FIELD OF THE INVENTION

The present invention relates generally to packet communication networks, and particularly to methods and apparatus for processing of packet headers.

BACKGROUND

Packet headers contain protocol information that enables network elements, such as switches, routers, and host computers, to process and steer packets to their destinations. Many network functions involve changing values of header fields, as well as adding and/or removing packet headers. For example, routers in Internet Protocol (IP) networks frequently remap IP addresses of packets for purposes of network address translation (NAT). As another example, routers in a label-switched network, such as Multi-Protocol Label Switching (MPLS) routers, push and pop labels (which are a form of headers) onto and off packets that they transmit.

"Packet steering" generally includes determining the required destination of a packet and forwarding the packet to this destination. U.S. Patent Application Publication 2013/0114599, whose disclosure is incorporated herein by reference, describes a method for steering packets by a network interface controller (NIC). The method includes receiving a packet and determining parameters to be used in steering the packet to a specific destination, in one or more initial steering stages, based on one or more packet-specific attributes. The method further includes determining an identity of the specific destination of the packet in one or more subsequent steering stages, governed by the parameters determined in the one or more initial stages and one or more packet-specific attributes, and forwarding the packet to the determined specific destination. The multi-stage steering process includes a plurality of stages in which a table lookup is performed based on packet specific information, e.g., address information in the packet.

SUMMARY

Embodiments of the present invention that are described hereinbelow provide improved techniques for packet header processing, and particularly for implementation of header processing functions in a NIC.

Communication apparatus, includes a host interface, which is configured to be connected to a peripheral component bus so as to communicate via the bus with a central processing unit (CPU) and a memory of a host computer. A network interface is configured to be connected to a network so as to transmit outgoing data packets to the network and receive incoming data packets from the network. Packet processing circuitry is coupled between the host interface and the network interface and is configured to receive from a first interface, selected from among the host interface and the network interface, a data packet including a header containing multiple fields having respective values, to identify, responsively to a value of at least one of the fields, a corresponding entry in a header modification table, and to modify the header in accordance with the identified entry. The data packet with the modified header is transmitted through a second interface selected from among the host interface and the network interface.

In some embodiments, one of the first and second interfaces is the host interface and the other of the first and second interfaces is the network interface. Alternatively, both the first and second interfaces are the network interface, such that the data packet is received from the network and is looped back to the network after modification of the header. Further alternatively, both the first and second interfaces are the host interface, such that the data packet is received from a process running on the CPU and is looped back, after modification of the header, to another process running on the CPU.

In a disclosed embodiment, the packet processing circuitry is configured to identify, responsively to the modified header, a steering instruction in a packet steering table, and to steer the packet to a destination via the second interface in accordance with the identified steering instructions.

Typically, the header modification table is stored in the memory of the host computer and is accessed by the packet processing circuitry via the peripheral component bus.

In some embodiments, the packet processing circuitry is configured to modify the header by rewriting a field of the header. In one embodiment, rewriting the field includes replacing an existing value of the field with a constant value. Alternatively, rewriting the field includes replacing an existing value of the field with a new value taken from another field in the header. Further alternatively, rewriting the field includes adding a constant value to an existing value of the field.

Alternatively or additionally, the packet processing circuitry is configured to modify the header by pushing one or more new header fields onto the packet. In a disclosed embodiment, the one or more new header fields constitute a new header, which is selected from a set of header types consisting of a virtual local area network (VLAN) header, a multi-protocol label switching (MPLS) label, and a provider backbone bridge (PBB) header.

Further alternatively or additionally, the packet processing circuitry is configured to modify the header by popping one or more of the fields from the header.

There is also provided, in accordance with an embodiment of the invention, a method for communication, which includes connecting a host interface of a network interface controller (NIC) to a peripheral component bus so as to communicate via the bus with a central processing unit (CPU) and a memory of a host computer. A network interface of the NIC is connected to a network so as to transmit outgoing data packets to the network and receive incoming data packets from the network. Upon receiving in the NIC from a first interface, selected from among the host interface and the network interface, a data packet including a header containing multiple fields having respective values, the NIC identifies, responsively to a value of at least one of the fields, a corresponding entry in a header modification table. The header is modified in the NIC in accordance with the identified entry, and the data packet with the modified header is transmitted through a second interface selected from among the host interface and the network interface.

The present invention will be more fully understood from the following detailed description of the embodiments thereof, taken together with the drawings in which:

DETAILED DESCRIPTION OF EMBODIMENTS

Figure 1:
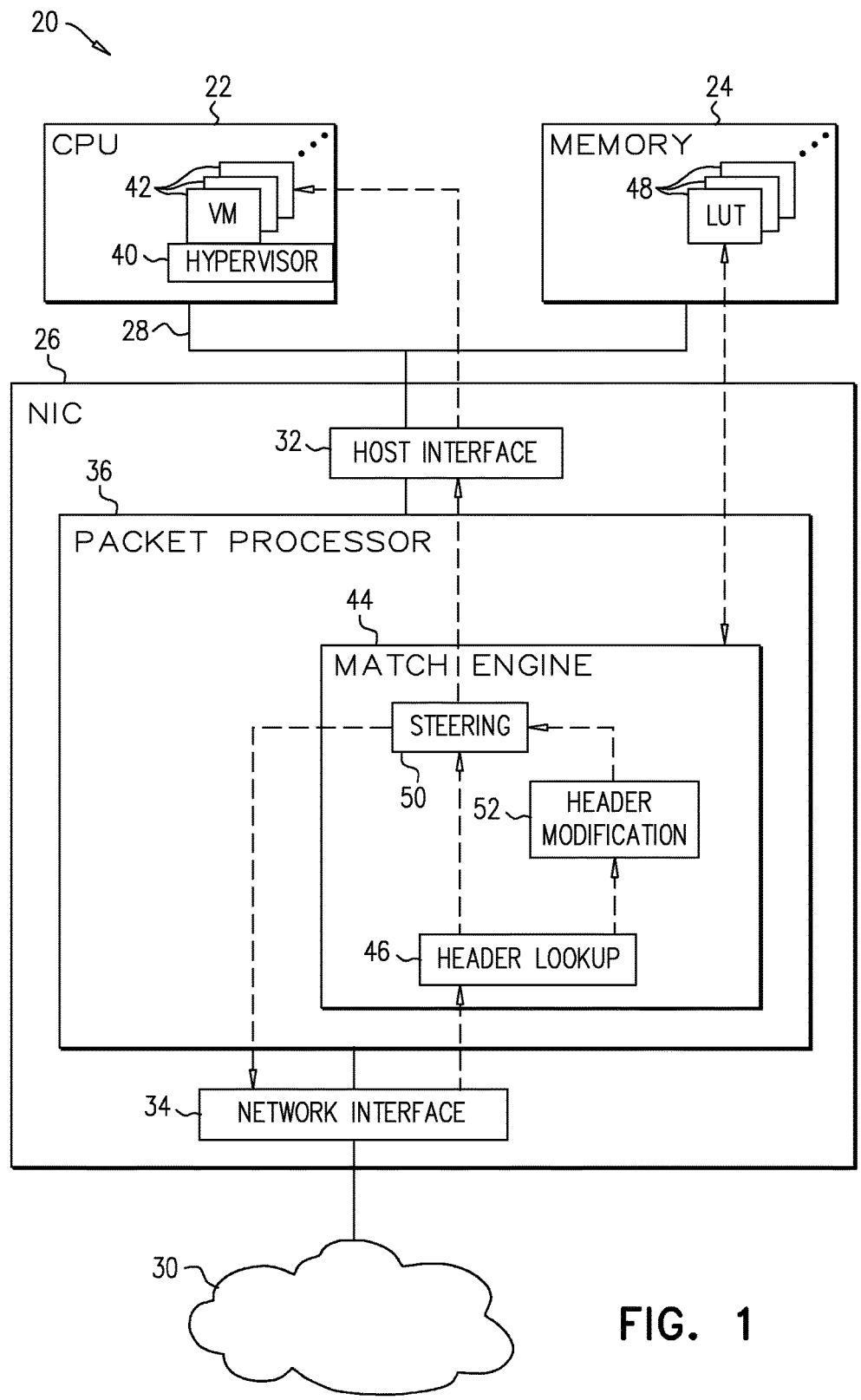
FIG. 1 is a block diagram that schematically illustrates a host computer with a NIC, in accordance with an embodiment of the invention.

When network protocols and functions require changes to header fields—such as in NAT or MPLS routing, as mentioned above—these functions are typically carried out by routers or network switches. To implement such functions, the router or switch must often store large tables in memory and apply complex, high-speed logic to the packets. Alternatively, header modification functions may be carried out by a CPU running suitable software in a network appliance. Both of these solutions, however, have limitations in terms of cost and scalability.

Embodiments of the present invention that are described herein implement header-modification functions in a NIC. This approach has the benefit of exploiting existing NIC interface logic, as well as taking advantage of the direct memory access (DMA) capabilities of the NIC in order to store header modification tables of effectively unlimited size in the host memory. Implementation of a number of simple header-modification primitives in the NIC can then be used, in combination with appropriate tables stored by the host computer, to offload certain network protocols and functions to the NIC. When configured in this manner, the NIC can perform desired header modifications not only on packets exchanged between the network and the host computer to which the NIC belongs, but also on packets that are transmitted to the NIC from the network and then looped back from the NIC to the network after header modification.

The embodiments disclosed in the present patent application relate to communication apparatus, such as a NIC, that comprises a host interface, which is connected to communicate over a peripheral component bus with a CPU and memory of a host computer, and a network interface, which is connected to a network so as to transmit and receive outgoing and incoming data packets to and from a network. Packet processing circuitry in the NIC, coupled between the host interface and the network interface, receives data packets from one of the interfaces, modifies the packet header, and then transmits the packets back out—either through another interface or through the same interface through which the packets were received. For this purpose, the packet processing circuitry uses the value of at least one of the header fields of the received packets to look up a corresponding entry in a header modification table, and then modifies the header accordingly. Typically (although not necessarily), the header modification table is stored in the memory of the host computer and is accessed by the packet processing circuitry via the peripheral component bus.

In some embodiments, the header modification instructions cause the packet processing circuitry to rewrite a field of the header. Such rewriting may include, for example, replacing an existing value of a header field with a specified constant value or with a new value taken from another field in the header, or possibly adding a specified constant value to an existing value of the field. These capabilities are useful, for example, in NAT and IP routing, as well as when the host computer is configured for other sorts of proxy operations, such as in changing header fields and packet sequence numbers in a Transmission Control Protocol (TCP) proxy.

Additionally or alternatively, the header modifications made by the NIC may include pushing one or more new header fields onto the packet and/or popping header fields from the packet. The header fields that are pushed and popped in this manner may constitute a complete header, such as a virtual local area network (VLAN) header, a multi-protocol label switching (MPLS) label, a provider backbone bridge (PBB) header, or encapsulation headers of other types.

In some embodiments, the NIC also includes a packet steering table, which contains steering instructions keyed by header field values, as described, for example, in the above-mentioned U.S. Patent Application Publication 2013/0114599. Following header modification, the packet processing circuitry uses to the modified header to look up the appropriate steering instructions in the packet steering table, and steer the packet to its destination as indicated by the instructions.

FIG. 1 is a block diagram that schematically illustrates a host computer 20 with a NIC 26 that performs header-processing functions, in accordance with an embodiment of the invention. Host computer 20 comprises a central processing unit (CPU) 22 and a host memory 24 which are connected to NIC 26 by a peripheral component bus 28, such as a PCIe bus.

NIC 26 comprises a host interface 32, which is connected to CPU 22 and memory 24 via bus 28, and a network interface 34, which is connected to a network 30, such as an IP or InfiniBand™ network. Packet processing circuitry 36 in NIC 26 is coupled between interfaces 32 and 34 so as to process incoming data packets that are delivered to computer 20 from network 30 and outgoing packets for transmission to the network. Typically, NIC 26 transmits and receives packets in multiple flows, wherein each such flow corresponds to a queue pair (QP), Ethernet ring, or IP tuple, for example. In virtualized environments, CPU 22 typically runs a hypervisor program 40, which supports multiple virtual machines 42, as is known in the art, and packet flows to and from computer 20 are typically associated with respective virtual machines.

Packet processing circuitry 36 in NIC 26 comprises a match engine 44, which handles incoming packets from network 30 by looking up the values of certain header fields in a set of look-up tables (LUTs) 48. Tables 48 may conveniently be stored in host memory 24, as shown in FIG. 1. Header lookup logic 46 in match engine 44 reads the table values from memory 24, typically by direct memory access (DMA) over bus 28. Additionally or alternatively, all or parts of tables 48 may be held in a separate, local memory (not shown), which is embedded in NIC 26 or connected to the NIC. For example, match engine 44 may cache certain table entries in the local memory for quick access.

LUTs 48 typically contain both header modification instructions and packet steering instructions. The header modification instructions are carried out by header modification logic 52, which changes header field values and/or adds and removes header fields as instructed. The packet steering instructions are carried out by steering logic 50. Depending on the instructions provided by LUT 48, steering logic 50 may steer the packet through host interface 32 to the appropriate destination VM 42 and process on CPU 22, or may loop the packet back through network interface 34 to network 30. (In actuality, when a packet is to be delivered to a process on CPU 22, steering logic 50 typically causes NIC 26 to write the packet to memory 24, and then to alert the appropriate VM 22, for example by issuing an interrupt.) Further features of LUTs of this sort and their use in packet steering are described in the above-mentioned U.S. Patent Application Publication 2013/0114599.

Although FIG. 1 shows only incoming packet flows from network 30 to host computer 20, match engine 44 can additionally or alternatively operate in a similar fashion on outgoing packets passed to NIC 26 by processes running on CPU 22. After header modification, such packets are either transmitted out to network 30 via network interface or may be looped back to another process (typically running on another virtual machine 42) on CPU 22.

Although match engine 44 is shown in FIG. 1, for the sake of conceptual clarity, as an independent functional block, in practice the functions of this match engine are typically integrated with other packet processing functions of circuitry 36 in a single integrated circuit. Engine 44 may be implemented in this context by means of dedicated or programmable logic circuits or, additionally or alternatively, by software or firmware running on a programmable processing core in NIC 26. All such implementations are considered to be within the scope of the present invention. The remaining packet processing functions of circuitry 36 will be apparent to those skilled in the art and are omitted here for the sake of brevity.

Figure 2:
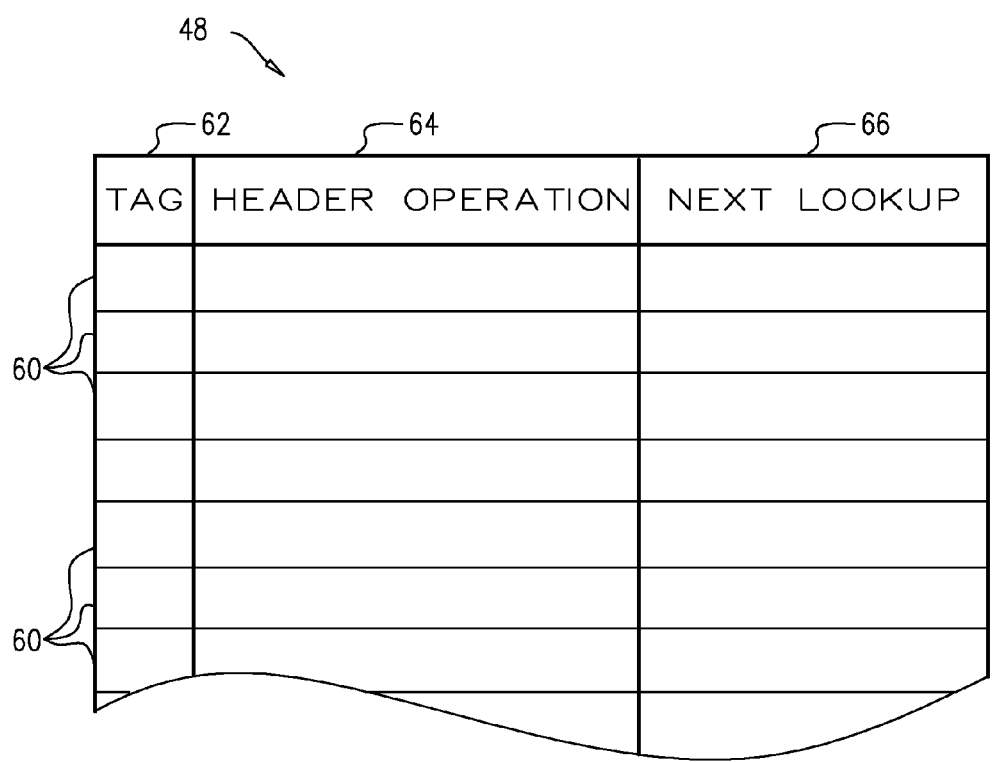
FIG. 2 is a schematic representation of a look-up table, in accordance with an embodiment of the invention.

FIG. 2 is a schematic representation of one of LUTs 48, in accordance with an embodiment of the invention. LUT 48 comprises multiple entries 60. Each entry is keyed by a tag 62, which typically corresponds to the value or values of one or more header fields of the packet that is to be processed or a hash over such values. Each entry 60 contains a header operation instruction 64 to be carried out by header modification logic 52, wherein the instruction typically comprises an operation code and, where appropriate, a value.

The operations indicated by instruction 64 can include header rewriting instructions, such as:
  Set field (destination, value);
  Copy field (destination, source);
  Add to field (destination, value).
The "destination" refers to the header field that is to be modified.

Additionally or alternatively, the operations indicated by instruction 64 can include "push field" and "pop field" instructions, indicating the contents of the field in question and the location in the header to which it is to be pushed or from which it is to be popped.

Entries 60 also include a next lookup pointer 66, indicating another entry containing additional instructions to be applied to the header of the packet in question. In this manner, LUT 48 can chain entries together and thus instruct match engine 44 to perform multiple header modifications in a predefined sequence.

Figure 3:
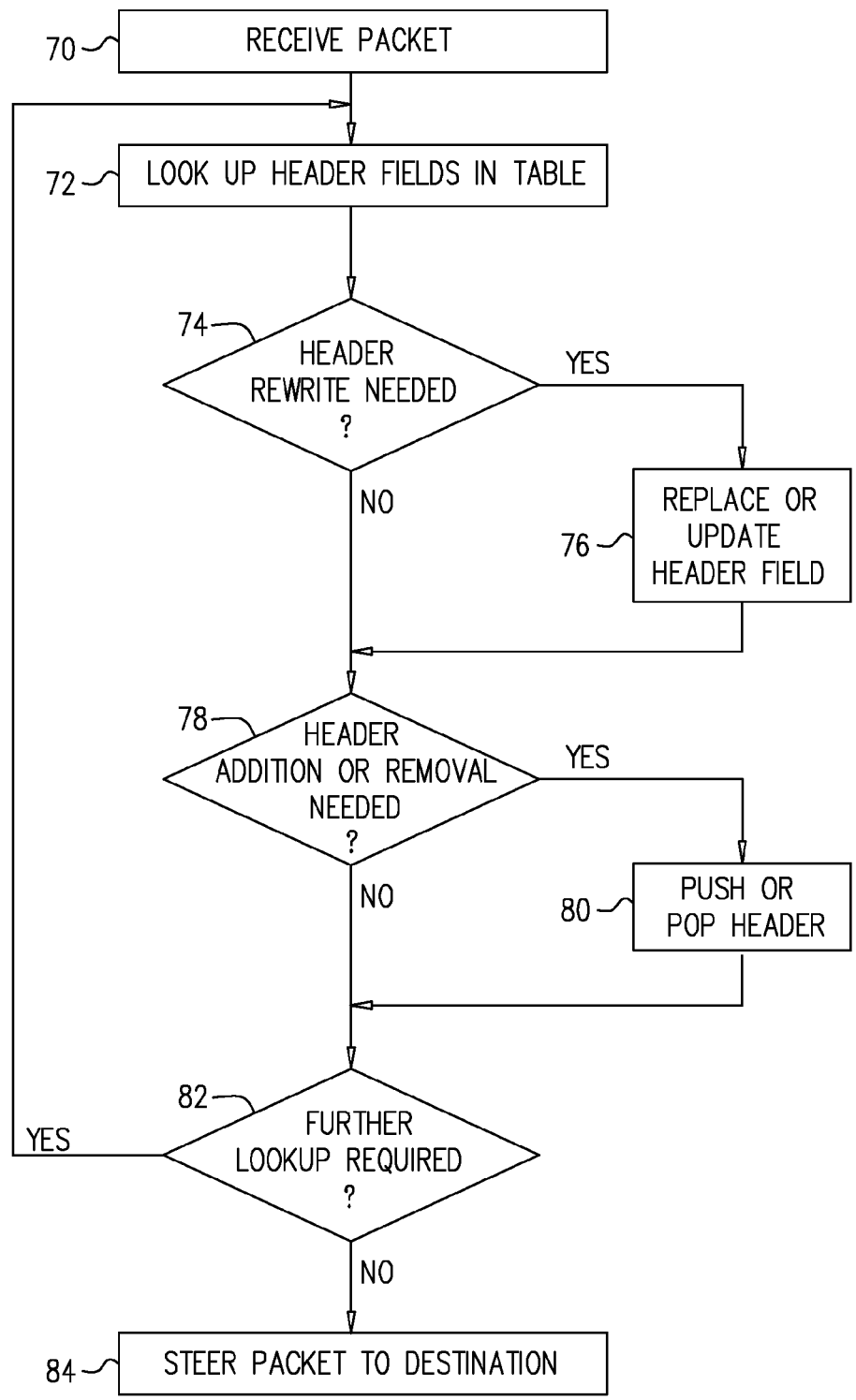
FIG. 3 is a flow chart that schematically illustrates a method for header modification, in accordance with an embodiment of the invention.

FIG. 3 is a flow chart that schematically illustrates a method for header modification, in accordance with an embodiment of the invention. The method is described here, for the sake of convenience and clarity, with respect to the elements of NIC 26 that are shown in FIG. 1. The principles of the method, however, are equally applicable, mutatis mutandis, in other sorts of hardware implementations. Such alternative implementations will be apparent to those skilled in the art after reading the present description and are considered to be within the scope of the present invention.

The method of FIG. 3 is initiated when packet processing circuitry 36 receives a packet for processing, at a packet reception step 70. As noted earlier, the method may be applied both to incoming packets received by NIC 26 via network interface 34 and to outgoing packets received via host interface 32. In the case of multicast packets, packet processing circuitry 36 may be required to create multiple copies of the packet for transmission to different destinations. In this case, match engine 44 may perform the required header modifications before duplication (such that the same modifications apply to all of the copies) or after duplication (whereby each copy may be modified independently).

Header lookup logic 46 looks up the appropriate header field of the packet in LUT 48 and returns the corresponding entry 60, at a lookup step 72. Header modification logic 52 reads the operation code in operation instruction 64 of the entry to determine whether rewriting of header fields is required, at a rewrite checking step 74. If so, logic 52 replaces or updates the value of the header field in question, at a rewriting step 76, as indicated by the instruction. If the packet contains a checksum that is calculated over the header, and a field included in the checksum calculation was modified, logic 52 also recalculates and replaces the checksum in the packet.

Header modification logic 52 also checks whether operation instruction 64 indicates that addition or removal of header fields is required, at a push/pop checking step 78. If so, logic 52 pops the designated header field off the packet and/or pushes a new header field onto the packet as required, at a push/pop step 80. Before popping a field, logic 52 typically checks the configuration of the packet header to ensure that the field in question exists in the packet in the appropriate location from which it is to be popped.

Match engine 44 next checks whether the value of pointer 66 in the selected entry 60 indicates that another lookup is to be performed, at a further lookup checking step 82. If so, header modification logic 52 returns to step 72 to perform the lookup indicated by the entry indicated by pointer 66.

When no further header operations are required, steering logic 50 consults the appropriate steering entry in LUTs 48 and steers the packet accordingly to its destination, at a steering step 84. The steering decision is made after header modification and may thus be affected by the header field values that were modified in the preceding steps. As noted earlier, the packet may be steered to its destination at this stage through either host interface 32 or network interface 34. In the case of multicast packets, packet processing circuitry 36 may create and send multiple copies of the packet to different destinations (with the required header modifications performed before duplication or after duplication, as explained above).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
  a host interface, which is configured to be connected to a peripheral component bus so as to communicate via the bus with a central processing unit (CPU) and a memory of a host computer;
  a network interface, which is configured to be connected to a network so as to transmit outgoing data packets to the network and receive incoming data packets from the network; and
  packet processing circuitry, which is coupled between the host interface and the network interface and is configured:
    to receive from a first interface, selected from among the host interface and the network interface, a data packet comprising a header containing multiple fields having respective values;
to identify, based on a value of at least one of the fields, a corresponding entry in a header modification table, stored in the memory of the host computer, and accessed via the peripheral component bus;
to modify the header in accordance with the identified entry; and
to transmit the data packet with the modified header through a second interface selected from among the host interface and the network interface,
wherein the header modification table includes for each entry, a field for a next lookup pointer, indicating another entry containing an additional instruction to be applied to the packet, and wherein the packet processing circuitry is configured to perform multiple header modifications in accordance with entries chained by the next lookup pointer field.

2. The apparatus according to claim 1, wherein one of the first and second interfaces is the host interface and the other of the first and second interfaces is the network interface.

3. The apparatus according to claim 1, wherein both the first and second interfaces are the host interface, such that the data packet is received from a process running on the CPU through the host interface and is looped back, after modification of the header, to another process running on the CPU through the host interface.

4. The apparatus according to claim 1, wherein the packet processing circuitry is configured to identify, responsively to the modified header, a steering instruction in a packet steering table, and to steer the packet to a destination in accordance with the identified steering instructions.

5. The apparatus according to claim 1, wherein the packet processing circuitry is configured to modify the header by rewriting a field of the header.

6. The apparatus according to claim 5, wherein rewriting the field comprises replacing an existing value of the field with a constant value.

7. The apparatus according to claim 5, wherein rewriting the field comprises replacing an existing value of the field with a new value taken from another field in the header.

8. The apparatus according to claim 5, wherein rewriting the field comprises adding a constant value to an existing value of the field.

9. The apparatus according to claim 1, wherein the packet processing circuitry is configured to modify the header by pushing one or more new header fields onto the packet.

10. The apparatus according to claim 9, wherein the one or more new header fields constitute a new header, which is selected from a set of header types consisting of a virtual local area network (VLAN) header, a multi-protocol label switching (MPLS) label, and a provider backbone bridge (PBB) header.

11. The apparatus according to claim 1, wherein the packet processing circuitry is configured to modify the header by popping one or more of the fields from the header.

12. The apparatus according to claim 1, wherein both the first and second interfaces are the network interface, such that the data packet is received from the network and is looped back to the network after modification of the header.

13. A method for communication, comprising:
connecting a host interface of a network interface controller (NIC) to a peripheral component bus so as to communicate via the bus with a central processing unit (CPU) and a memory of a host computer;
connecting a network interface of the NIC to a network so as to transmit outgoing data packets to the network and receive incoming data packets from the network;
receiving in the NIC from a first interface, selected from among the host interface and the network interface, a data packet comprising a header containing multiple fields having respective values;
identifying by the NIC, based on a value of at least one of the fields, a corresponding entry in a header modification table in the memory of the host computer, accessed by the NIC via the peripheral component bus;
modifying the header in the NIC in accordance with the identified entry; and
transmitting the data packet with the modified header through a second interface selected from among the host interface and the network interface,
wherein the header modification table includes for each entry, a field for a next lookup pointer, indicating another entry containing an additional instruction to be applied to the packet, and wherein the NIC is configured to perform multiple header modifications in accordance with entries chained by the next lookup pointer field.

14. The method according to claim 13, wherein one of the first and second interfaces is the host interface and the other of the first and second interfaces is the network interface.

15. The method according to claim 13, wherein both the first and second interfaces are the host interface, such that the data packet is received from a process running on the CPU through the host interface, and transmitting the data packet comprises looping the data packet back, after modifying the header, to another process running on the CPU, through the host interface.

16. The method according to claim 13, wherein transmitting the data packet comprises identifying in the NIC, responsively to the modified header, a steering instruction in a packet steering table, and steering the packet to a destination in accordance with the identified steering instructions.

17. The method according to claim 13, wherein modifying the header comprises rewriting a field of the header.

18. The method according to claim 17, wherein rewriting the field comprises replacing an existing value of the field with a constant value.

19. The method according to claim 17, wherein rewriting the field comprises replacing an existing value of the field with a new value taken from another field in the header.

20. The method according to claim 17, wherein rewriting the field comprises adding a constant value to an existing value of the field.

21. The method according to claim 13, wherein modifying the header comprises pushing one or more new header fields onto the packet.

22. The method according to claim 21, wherein the one or more new header fields constitute a new header, which is selected from a set of header types consisting of a virtual local area network (VLAN) header, a multi-protocol label switching (MPLS) label, and a provider backbone bridge (PBB) header.

23. The method according to claim 13, wherein modifying the header comprises popping one or more of the fields from the header.

24. The method according to claim 13, wherein both the first and second interfaces are the network interface, such that the data packet is received from the network, and transmitting the data packet comprises looping the data packet back to the network after modification of the header.

\* \* \* \* \*